United States Patent

Oida et al.

[11] Patent Number: 5,987,186
[45] Date of Patent: *Nov. 16, 1999

[54] IMAGE PROCESSING APPARATUS AND SYSTEM HAVING DETACHABLY MOUNTED READ CARTRIDGE

[75] Inventors: Jun Oida; Atsushi Nakamura, both of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/755,949

[22] Filed: Nov. 25, 1996

[30] Foreign Application Priority Data

Dec. 7, 1995 [JP] Japan .................................. 7-319287

[51] Int. Cl.$^6$ ............................ H04N 1/024; H04N 1/04; H04N 1/407
[52] U.S. Cl. ......................... 382/274; 358/445; 358/446; 358/461; 358/497
[58] Field of Search .......................... 382/274; 358/461, 358/406, 445, 446, 497, 494, 471, 472, 296

[56] References Cited

U.S. PATENT DOCUMENTS

| | | | |
|---|---|---|---|
| 3,886,371 | 5/1975 | Lloyd | 358/497 |
| 4,779,141 | 10/1988 | Watanabe | 358/497 |
| 5,191,445 | 3/1993 | Kurokawa et al. | 358/461 |
| 5,663,806 | 9/1997 | Grise et al. | 358/497 |
| 5,694,225 | 12/1997 | Suzuki | 358/461 |
| 5,721,626 | 2/1998 | Kimura | 358/497 |

FOREIGN PATENT DOCUMENTS 8-323971  12/1996  Japan ................................ B41J 3/44

*Primary Examiner*—Scott Rogers
*Attorney, Agent, or Firm*—Fitzpatrick, Cella, Harper & Scinto

[57] ABSTRACT

In an image processing device, a white level reference value is obtained by allowing an CCD sensor to scan a white level standard sheet. The white level reference value is stored in SRAM which is resident in a scan cartridge. The white level reference value in the SRAM is modified when an original document is read through a clear sheet, to obtain a high-quality image.

62 Claims, 20 Drawing Sheets

SCANNER CONTROL IC I/O REGISTER MAP

VIEWED FROM SIDE

VIEWED FROM ABOVE

1403. ORIGINAL RAISED ABOVE REFERENCE LEVEL
1402. REFERENCE LEVEL OF ORIGINAL
1404. ORIGINAL LOWERED BELOW REFERENCE LEVEL

1403. ORIGINAL RAISED ABOVE REFERENCE LEVEL
1402. REFERENCE LEVEL OF ORIGINAL
1404. ORIGINAL LOWERED BELOW REFERENCE LEVEL

| ACCUMULATION TIME (SECONDS) | CARRIAGE SPEED (INCHES/SECOND) ||
|---|---|---|
| | X | X/2 |
| 1/(X*360) | 360 dpi | 720 dpi |
| 2/(X*360) | 180 dpi | 360 dpi |

FIG. 18

| BIT NUMBER | BIT CONTENT VIEWED FROM HOST | BIT CONTENT VIEWED FROM PRINTER |
|---|---|---|
| BIT 0 | 0 = DEFAULT STATE<br>1 = DATA TRANSMISSION FROM STATUS PORT 2 IN PROGRESS | 0 = DEFAULT STATE<br>1 = DATA RECEPTION FROM STATUS PORT 2 IN PROGRESS |
| BIT 1 | 0 = DEFAULT STATE<br>1 = DATA RECEPTION FROM STATUS PORT 2 IN PROGRESS | 0 = DEFAULT STATE<br>1 = DATA TRANSMISSION FROM STATUS PORT 2 IN PROGRESS |
| BIT 2 | 0 = WRITE ENABLED AT STATUS PORT 3<br>1 = WRITE DISABLED AT STATUS PORT 3 | — |
| BIT 3 | 0 = PRINTER POWER ON<br>1 = PRINTER POWER OFF | — |
| BIT 4 | 0 = PRINTER READY<br>1 = PRINTER BUSY | — |
| BIT 5 | 0 = STATUS PORT INITIALIZED<br>1 = INITIALIZATION OF STATUS PORT IN PROGRESS | — |

1801 → BIT 0
1802 → BIT 1
1803 → BIT 2
1804 → BIT 3
1805 → BIT 4
1806 → BIT 5

FIG. 19

| | COMMAND PARAMETER | COMMAND CONTENT |
|---|---|---|
| 1901 → | 1000H | INITIALIZE PORT |
| 1902 → | 4000H | TRANSFER PRINT IMAGE |
| 1903 → | 8000H ~8F78H | SCAN COMMAND |
| 1904 → | 9000H ~9F78H | FEED |
| 1905 → | 9FF0H | DISCHARGE PAPER |
| 1906 → | 9FF1H | FEED PAPER |
| 1907 → | A801H | ACQUIRE INFORMATION ABOUT PRESENT HEAD UNIT |
| 1908 → | A805H | ACQUIRE SCANNING RESOLUTION |
| 1909 → | AD00H ~AD3FH | READ WHITE LEVEL REFERENCE VALUES OF HEADS BY A UNIT OF TWO HEADS AT A TIME (ACCUMULATION TIME 512 μs) |
| 1910 → | AD40H ~AD7FH | READ WHITE LEVEL REFERENCE VALUES OF HEADS BY A UNIT OF TWO HEADS AT A TIME (ACCUMULATION TIME 256 μs) |
| 1911 → | AD80H | READ HEAD ID |
| 1912 → | AD81H | READ TEMPERATURE AT TIME OF SCANNING |
| 1913 → | ADF0H | EXECUTE MEASUREMENT OF WHITE REFERENCE VALUE |
| 1914 → | B805H | SET SCANNING RESOLUTION |
| 1915 → | BD00H ~BD3FH | SET WHITE LEVEL REFERENCE VALUE FOR EACH HEAD BY A UNIT OF TWO HEADS AT A TIME (ACCUMULATION TIME 512 μs) |
| 1916 → | BD40H ~BD7FH | SET WHITE LEVEL REFERENCE VALUE FOR EACH HEAD BY A UNIT OF TWO HEADS AT A TIME (ACCUMULATION TIME 256 μs) |
| 1917 → | BDF0H | EXECUTE SETTING OF WHITE LEVEL REFERENCE VALUE |
| 1918 → | D000H | MOVE CARRIER TO HEAD REPLACEMENT POSITION |
| 1919 → | D100H | END HEAD REPLACEMENT |

FIG. 20

| BIT NO. | DATA CONTENT RETURNED TO HOST |
|---|---|
| 2001 → BIT 0 | 0 = SCANNER HEAD MOUNTED<br>1 = PRINTER HEAD MOUNTED |
| 2002 → BIT 1 | 0 = NO HEADS MOUNTED AT ALL<br>1 = HEAD INDICATED AT BIT 0 IS MOUNTED |

FIG. 21

| BIT NO. | DATA CONTENT |
|---|---|
| 2101 → BIT 0 | 1 = 360 dpi |
| 2102 → BIT 1 | 1 = 180 dpi |
| 2103 → BIT 2 | 1 = 90 dpi |

IMAGE PROCESSING APPARATUS AND SYSTEM HAVING DETACHABLY MOUNTED READ CARTRIDGE

BACKGROUND OF THE INVENTION

1. Field of the Invention

The present invention relates to an image processing device and system, and more particularly to an image processing device and system which picks up an image from an original document and processes the image.

2. Description of the Related Art

Typically, in a scanning operation, available scanners project a light ray onto an original to be scanned, the light ray is reflected from the original and then enters optical block of the scanner, and the level of the light ray is analog-to-digital converted (hereinafter A/D converted) into a digital value that is output as scanned image information. One of the important parameters that determines the image quality of such a scanner is contrast of the image. The contrast of the image is defined as the range between the darkest pixel in the image and the lightest pixel in the image. The scanner A/D converts acquired analog image data into digital data within the range of contrast. The contrast information is represented relative to a white level reference, namely, digital data that is obtained when the optical system of the scanner scans a white reference surface. Specifically, when analog image data from each pixel is A/D converted, white reference data is used as a reference.

When the scanner reads the image and the white level reference, its output is determined depending on the hardware such as a light source, an optical sensor, an A/D converter circuit. Also determined are position accuracy and variations among individual scanners. When reading any given pixel, the rate of variation dependent on these factors should be kept to a minimum to obtain a reliable output from the pixel and then achieve excellent image quality. To this end, a diversity of methods are implemented: for example, high precision components are used, the light intensity of the light source is increased, the read time per pixel is increased, and measurement of white level as a reference is performed at each scanning of the original.

When the scanner scans the original through a clear sheet, light transmissivity of the clear sheet lowers reflectance of the original, and thus, a contrast correction circuit corrects the reflectance or the white level reference is updated each time a scan is completed.

When the miniature size and low cost of the scanner are dictated by portability, space requirement, and economy considerations, components in use are subject to limitations: for example, components having high precision, heat resistance, and high noise immunity, or electric circuits containing such components, are difficult to employ. The output level of the light source cannot be increased from the standpoint of power saving, low-cost design, and heat dissipation. For this reason, light sources with a small light intensity, such as a low-cost Xe lamp and an LED, are frequently used. To acquire data in a reliable fashion, the read time per pixel (accumulation time per pixel) is prolonged, and the gain of the sensor is increased. These all contribute to the increase in the cost of the scanner. Occasionally, miniaturization of the scanner results in a scanner which cannot physically accommodate a white level measuring surface (white surface) for measuring the white level reference. In such a case, a user must place a white level standard sheet on an original document mount to measure the white level reference and scan it.

Some wordprocessors today are equipped with a serial printer in which a print head cartridge, as recording means, can be replaced with a scan head cartridge that is similarly sized to the print head cartridge. In this way, wordprocessors with such a scanner unit mounted can function as a scanner device as well.

Unlike a normal flat head scanner, a serial scanner has a scanner-unit mounted carriage that is designed to travel a relatively long distance, and thus scan time is prolonged. Because of the long scan time, an increase of accumulation time of a sensor such as a CCD is difficult to implement. Furthermore, acquisition of the white level reference takes time accordingly.

When scanning is performed through a clear sheet, physical characteristics of the clear sheet degrade the reading accuracy and gain of the sensor. Because of this, the serial scanner must be periodically calibrated in connection with the white level reference measurement using the white level standard sheet. The serial scanner takes time to complete scanning, making frequent calibrations impractical and resulting in a degradation in image quality.

SUMMARY OF THE INVENTION

It is an object of the present invention to provide a miniature and low-cost image processing system that presents a high-quality image.

It is another object of the present invention to provide an easy-to-use image processing device that presents a high-quality image.

To achieve the above objects, the image processing device of the present invention with a slidable carriage, in one embodiment, comprises a read cartridge that is mounted on the carriage during use, said cartridge comprising photoelectric converter means for optically reading an image from an original document and converting the image into an image signal, and memory means for storing reference data that is used to correct the image signal output by the photoelectric converter means.

The image processing system of the present invention in another embodiment comprises a control device, and an image processing device connected to the control device, with a slidable carriage, which comprises a read cartridge that is mounted on the carriage during use, said cartridge comprising: photoelectric converter means for optically reading an image from an original document and converting the image into an image signal, and memory means for storing reference data that is used to correct the image signal output by the photoelectric converter means.

In the above arrangement, a compact read cartridge is used to read an original document, and the read image is subjected to a correction so that a high-quality image is acquired.

These and other objects and advantages of the present invention will become more apparent when the following detailed description of the present invention is considered with the following drawings.

BRIEF DESCRIPTION OF THE DRAWINGS

FIG. 18 shows the organization of dedicated status port 1 used for exchanging data between the host personal computer 200 and printer/scanner block 219 in the serial printer/scanner built-in personal computer system.

FIG. 19 shows a variety of control commands for the serial printer/scanner block.

FIG. 20 shows the organization of dedicated status port 2 used for exchanging data between the host personal computer 200 and printer/scanner block 219 in the serial printer/scanner built-in personal computer system.

FIG. 21 shows the organization of dedicated status port 3 used for exchanging data between the host personal computer 200 and printer/scanner block 219 in the serial printer/scanner built-in personal computer system.

DESCRIPTION OF THE PREFERRED EMBODIMENTS

Figure 1:
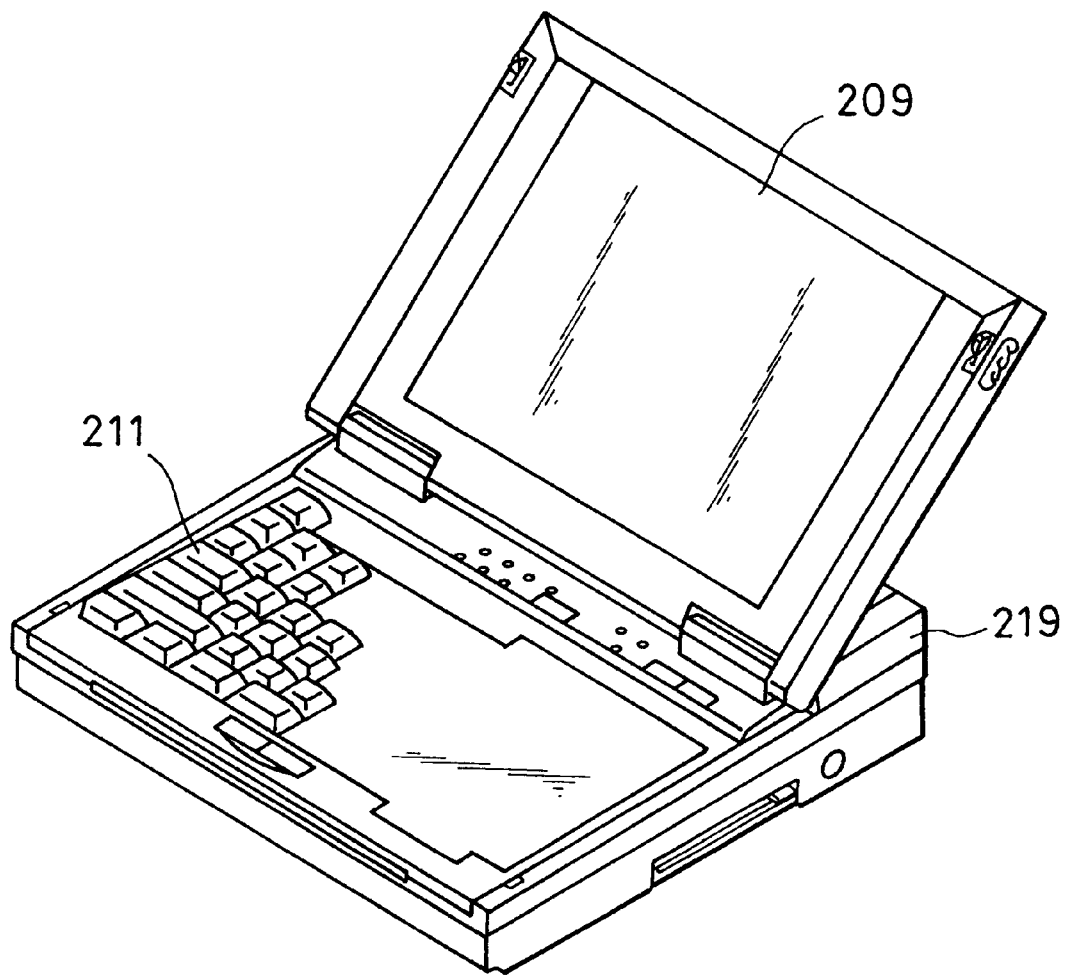
FIG. 1 shows generally a personal computer having a built-in serial printer/scanner block.

Referring now to the drawings, the embodiments of the present invention will now be discussed.

Printer/Scanner Block and its Host Personal Computer

Figure 2:
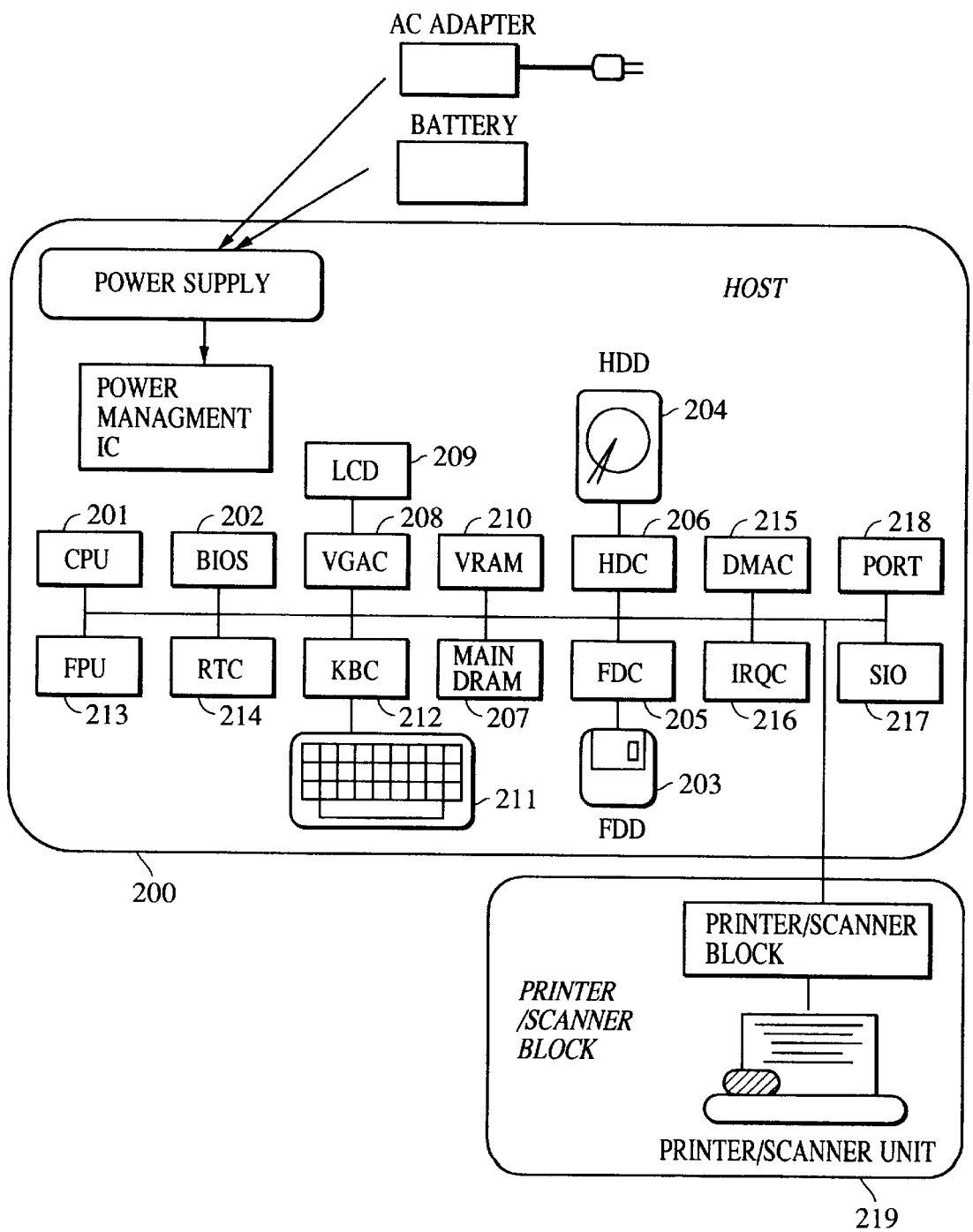
FIG. 2 is a block diagram of the personal computer having the built-in serial printer/scanner block.

FIG. 1 shows generally a portable personal computer system having a built-in serial printer. FIG. 2 is a block diagram of the personal computer. The personal computer, equipped with a carriage that carries the print head cartridge of a serial ink-jet printer, is adapted to mount a scan head cartridge that has identically sized to replace the print head cartridge, and thus the personal computer also works as a scanner for scanning or reading a document.

In the host personal computer (more simply referred to as host), a central processor unit (CPU) 201 generally controls the entire computer system, and its basic control program is stored in BIOS ROM 202. CPU 201 reads an application program from non-volatile read/write memory such as a floppy disk (FDD) 203 or a hard disk (HDD) 204 through a floppy disk controller (FDC) 205 or a hard disk controller (HDC) 206, respectively, expands the application into the system main memory 207, and executes the application from the system main memory 207. To visually present an image, a video graphic array controller (VGAC) 208 displays, on a liquid-crystal display (LCD) 209, characters and the like written in a video memory (VRAM) 210. A keyboard input from a keyboard 211 is fed through a keyboard controller (KBC) 212. A floating-point arithmetic unit (FPU) 213 supports CPU 201 in its arithmetic operation.

A real time clock (RTC) 214 presents a current elapsed time, and continuously operates from its dedicated battery even when power for the entire system is interrupted. An unshown SRAM memory stores system status information about the status of the system. This memory is also backed up by the above mentioned dedicated battery and retains its content while power is removed. A DMA controller (DMAC) 215 performs data transfer without CPU intervention to transfer data rapidly between memory and memory, between memory and I/O, and between I/O and I/O. An interrupt request controller (IRQC) 216 receives an interrupt request from each I/O, and executes the interrupt request according to the priority of requests. A timer has a plurality of channels of free-running timer outputs, and performs a variety of time controls. Also included in the host are a serial interface (SIO) 217 linked to an external system, an extension port (PORT) 218, and LEDs (not shown) for indicating statuses to a user.

The host personal computer is connected to the serial printer/scanner block 219. By selectively mounting either a detachable print head or a detachable scan head on the carriage of the printer, the personal computer performs printing or scanning operation, respectively.

The printer is connected to the host personal computer through a parallel interface. The host personal computer and a printer controller exchange status data and print/scan data at the register level of the I/O ports.

Printer/Scanner Block

Figure 3:
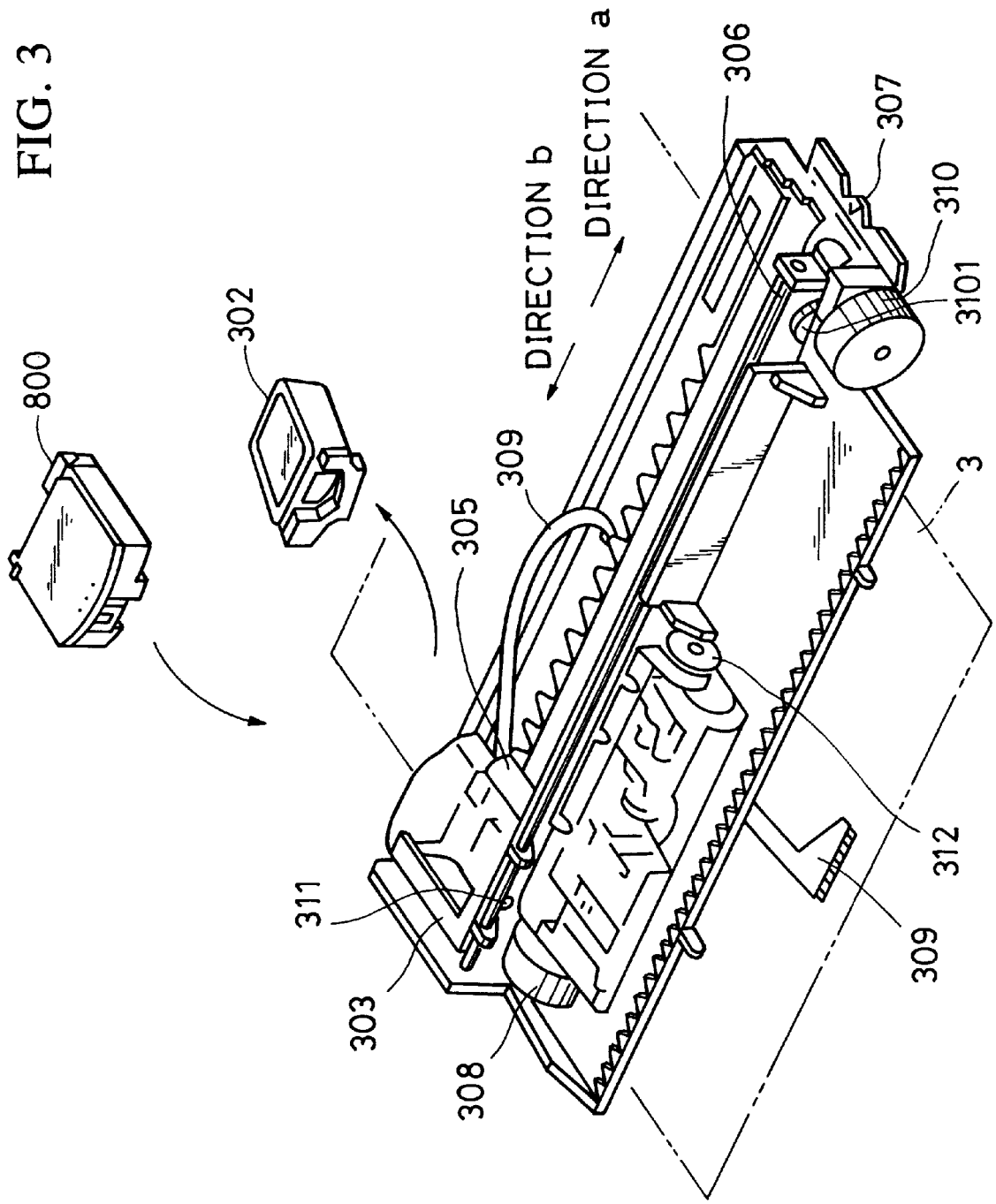
FIG. 3 is a perspective view of the serial printer/scanner block.

FIG. 3 is a perspective view that shows the internal organization of the printer/scanner block 219 of the present embodiment that employs an ink-jet recording system. FIG. 3 shows a print head cartridge 302, a carriage 305 for attaching the cartridge 302 on the printer/scanner block, and a guide 306 for guiding the carriage 305 in the sub scan direction. A feed roller 307 advances a recording paper 3 in the main scan direction. A paper transport motor 308 rotates the feed roller 307. The carriage 305 has a printed circuit board (not shown) which contains an electric circuit for controlling the printer and which connects to an FPC cable 309 that carries a driving pulse current signal that drives the print head cartridge 302 and a head temperature control current.

A driving carriage motor 310 rotates in forward or reverse direction. The carriage 305 is engaged with a carrier belt (not shown) that is driven by a drive transmission gear 3101 which rotates in response to the forward and reverse rotations of the carriage motor 310. The carriage 305 thus moves in directions a and b in a reciprocal fashion. A photocoupler 311 is home position sensor means which switches the direction of rotation of the carriage motor 310 by sensing the presence of the carriage 305. An automatic sheet feeding (ASF) motor 312 advances the recording paper 3 by means of an ASF roller (not shown) until the recording paper 3 reaches the above-described feed roller 307.

Figure 4:
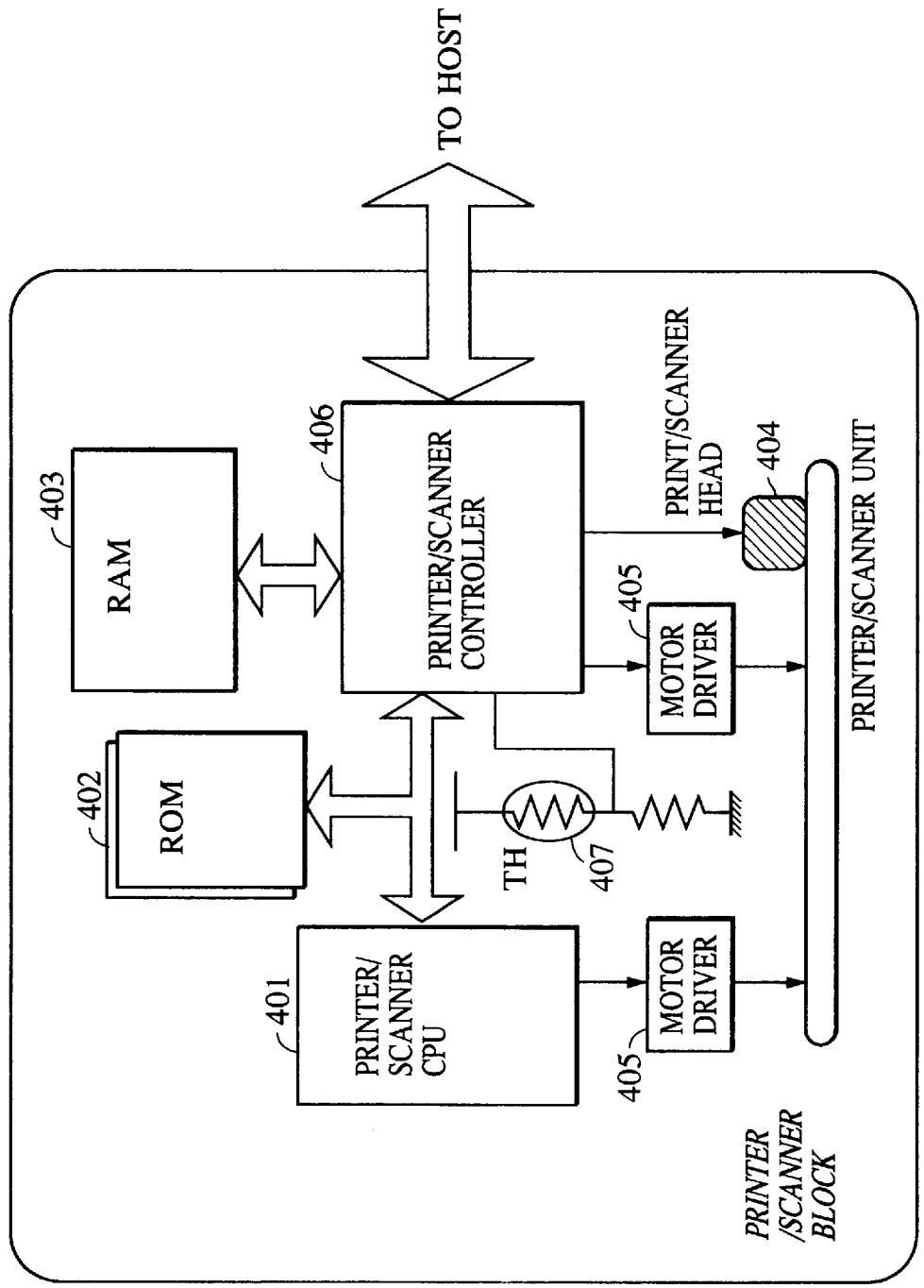
FIG. 4 is a block diagram of the serial printer/scanner block.

FIG. 4 is the block diagram of the printer/scanner block. The printer/scanner block 219 comprises CPU 401 for controlling the printer, ROM 402 for storing a printer/scanner control program, printer emulation, and print fonts, RAM 403 for storing expanded data to be printed, image data picked up by the scanner, and data received from the host, a print/scan head 404 for the printer/scanner, a motor driver 405 for driving the motor, and a printer/scanner controller 406 for controlling memory access, exchanging data with the host personal computer, and outputting a control signal to the printer driver. A thermistor 407 is also provided to control the temperature of the housing of the entire block.

While CPU 401 mechanically and electrically controls the printer/scanner block according to the control program in ROM 402, it reads from I/O data register set 501 (shown in FIG. 5) in the controller an emulation command that is fed to the printer/scanner block from the host section, and writes and reads the control content corresponding to the emulation command to and from the I/O data register set and the I/O port in the printer/scanner controller.

Printer/Scanner Controller

Figure 5:
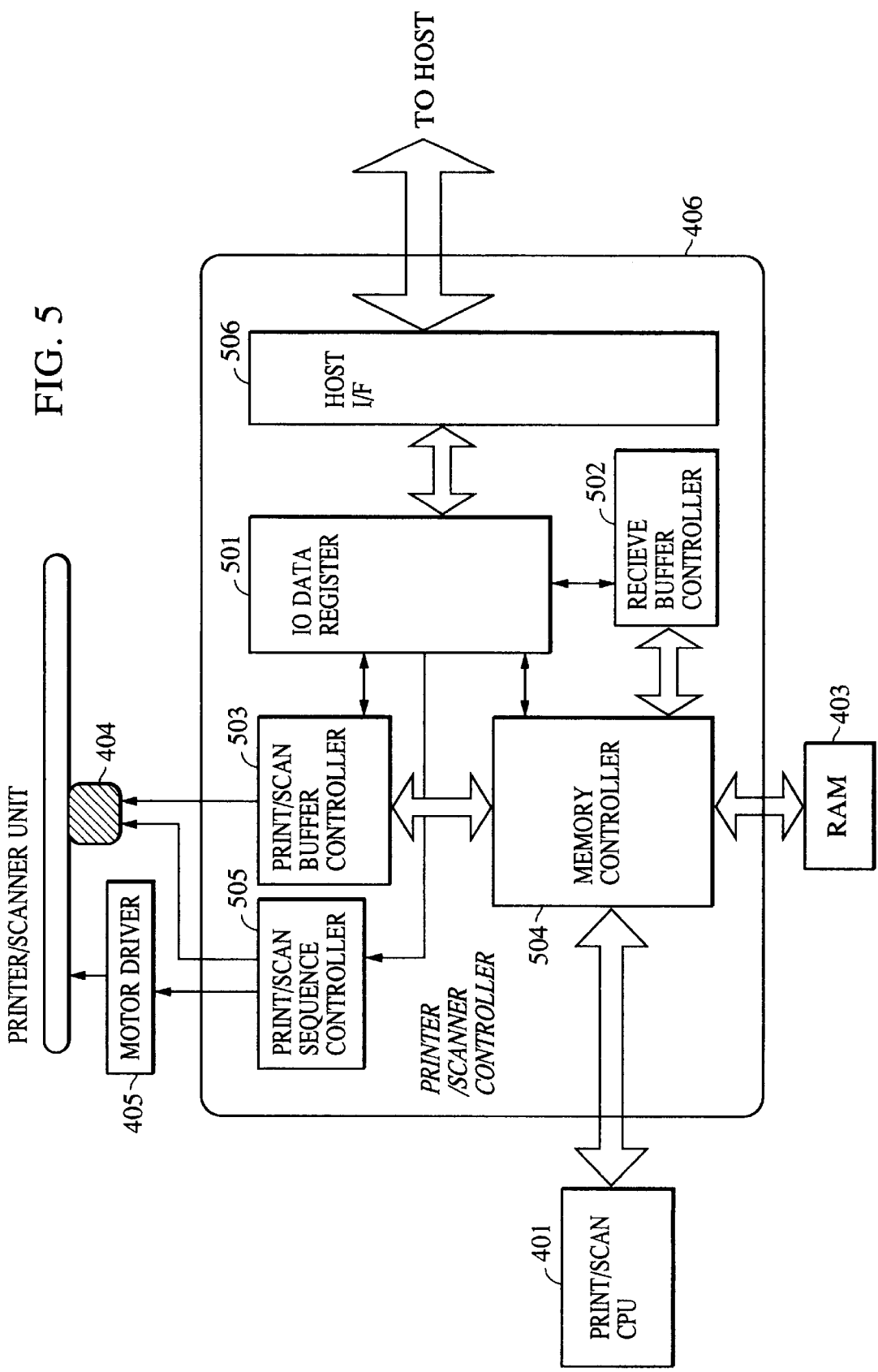
FIG. 5 is a block diagram of the serial printer/scanner controller.

FIG. 5 is a block diagram of the printer/scanner controller 406.

The controller 406 comprises the I/O data register set 501 for exchanging data at command level with the host, a receive buffer controller 502 for writing the received data from the register 501 directly onto RAM 403, a print/scan buffer controller 503 which, during printing, reads the received data from the recording data buffer in RAM 403 and sends the data to the print head, and which, during scanning, writes data coming in from the scan head directly onto the recording buffer in RAM 403, a memory controller 504 for controlling memory access from three directions to RAM 403, a print/scan sequence controller 505 for controlling print/scan sequence, and a host interface 506 for controlling communications with the host.

Figure 6:
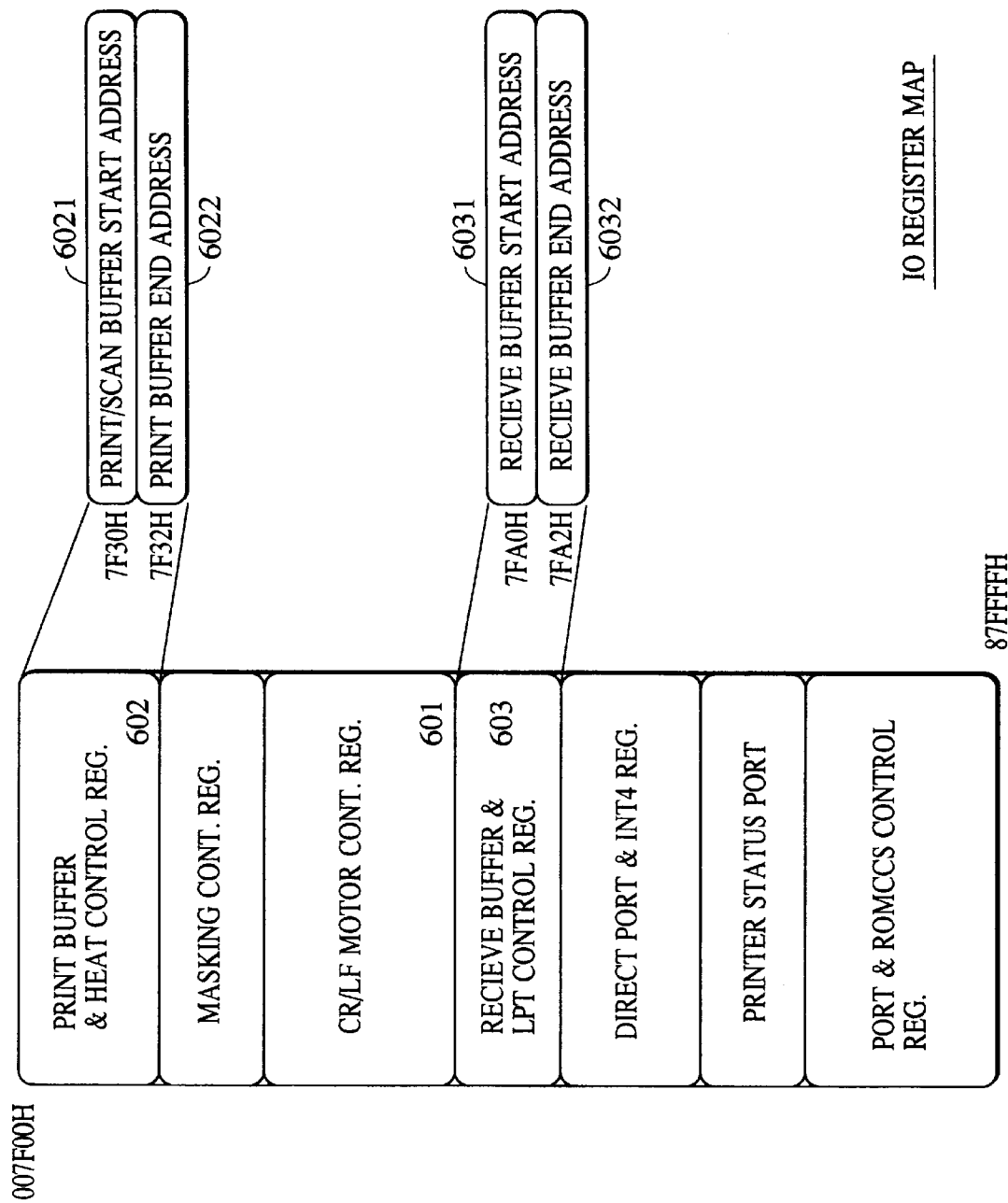
FIG. 6 shows the map of an I/O data register set of the serial printer/scanner block.

FIG. 6 shows the map of the I/O data register set 501 in the printer/scanner block. A motor control port register 601 is used to control ports and drive each motor by rewriting its value.

A print buffer and heat control register 602 defines a data area required for print and scan operations. By setting a start address 6021 and a stop address 6022 (only the start address is used during scanning), the print/scan buffer controller 503 reads the recording data in RAM 403 within the range from the start address to the stop address, and then writes the recording data to the data buffer register. The data address pointer indicates the data address of the current data being sent or being written. During printing, the read data is transferred to the print head, and the head driver in the print head issues the control signal. During scanning, the data coming from the scan head is written on the buffer register.

Figure 7:
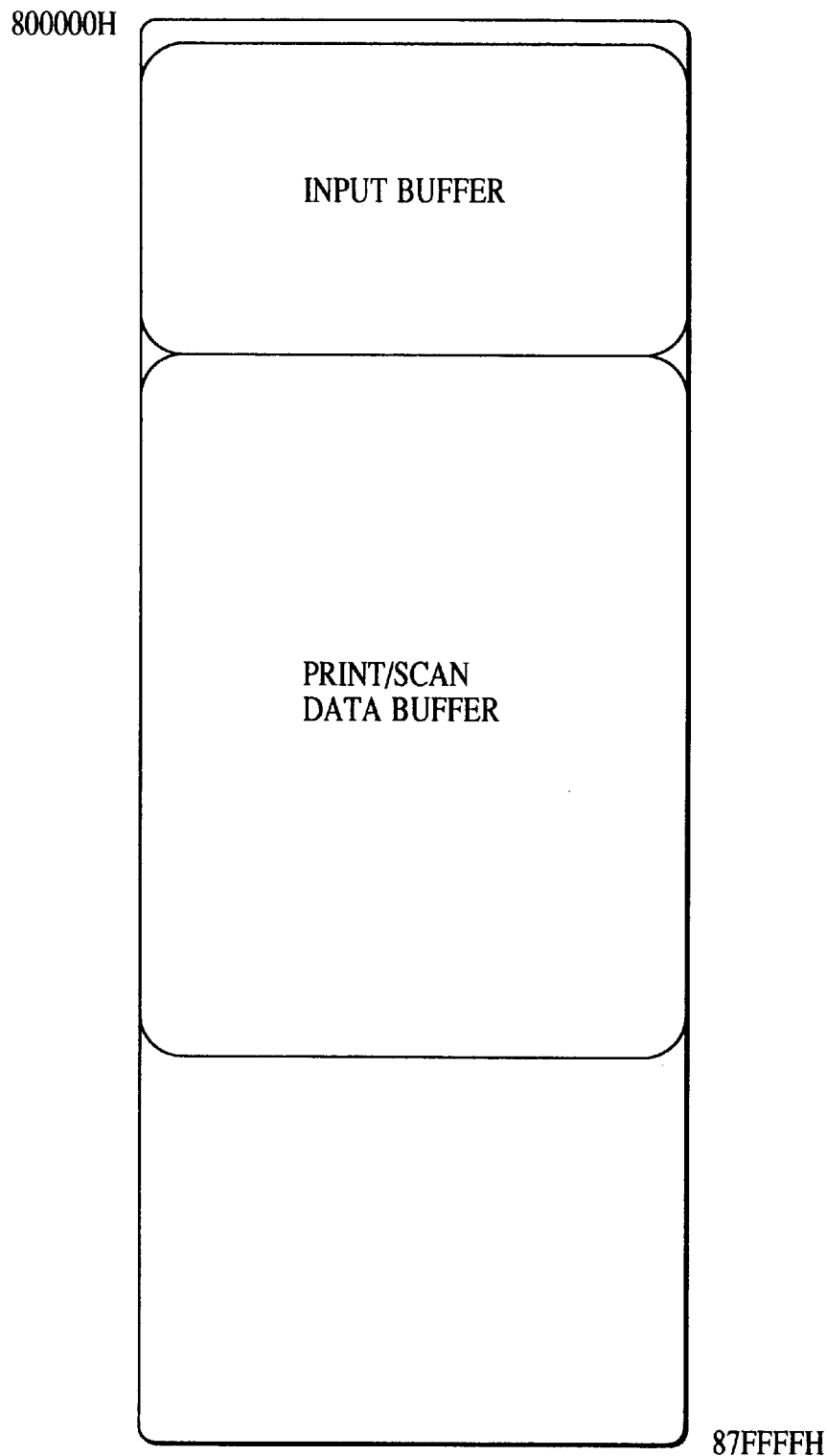
FIG. 7 shows the organization of record data buffer area and receive data buffer area in RAM 403.

A receive buffer register 603 defines a data area required for reception. By setting a start address 6031 and a stop address 6032 (only the start address is used during scanning), the receive buffer controller 502 writes the recording data in RAM 403 within the range from the start address to the stop address. The data address pointer indicates the data address that has now received data. FIG. 7 shows the address areas for the recording data buffer and receive buffer in RAM 403 in the above operations.

Scanner

Figure 8:
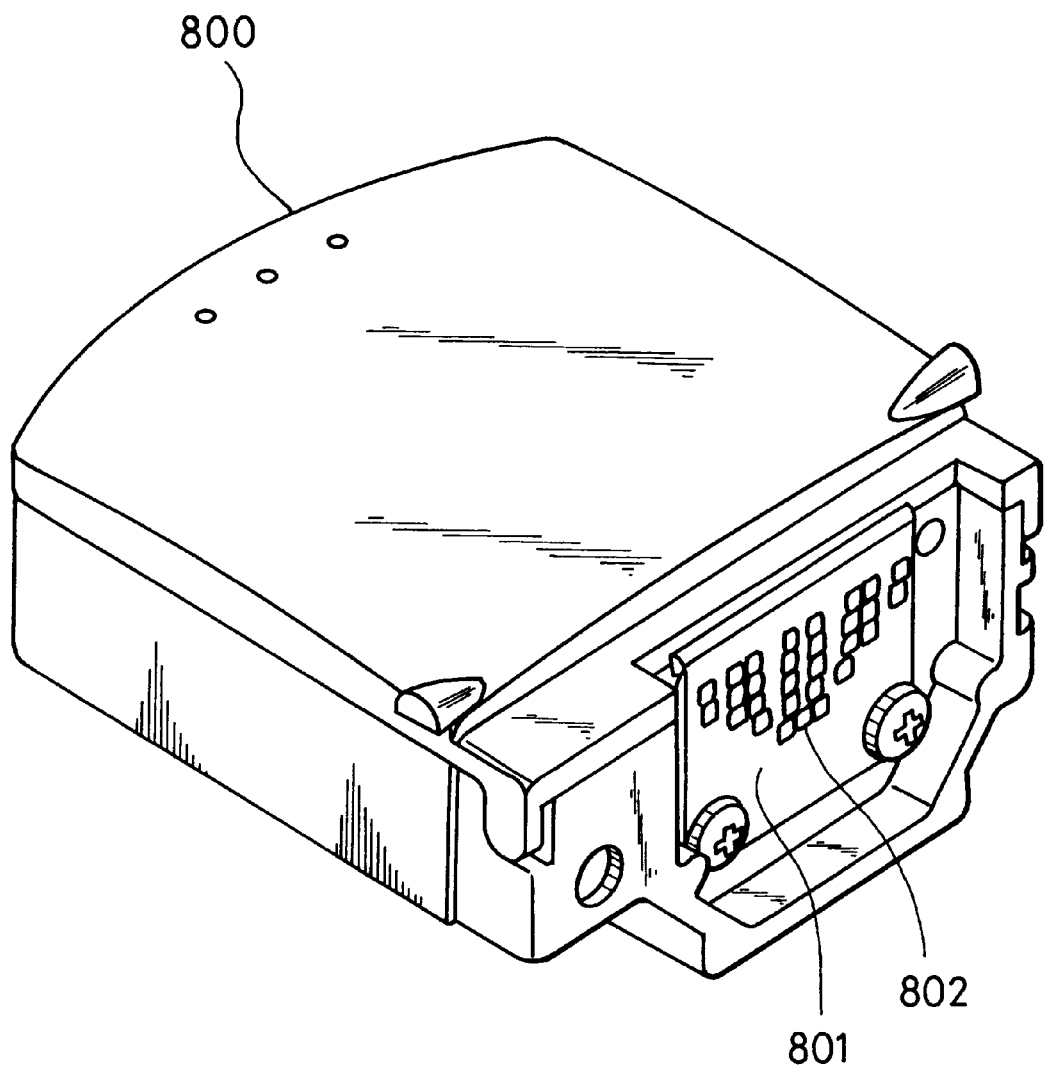
FIG. 8 is a perspective view of a scan head cartridge.

FIG. 8 is a perspective view showing the scan head cartridge 800. The scan head cartridge 800 to be mounted on the printer/scanner block in FIG. 3 is sized to replace the print head cartridge 302 used for printing, and has a connector 801 for electric connection with the printer/scanner block, having compatibility with the one for the print head cartridge. The carriage 305 in FIG. 3 transmits and receives control signals and scanned signals to and from the scan head cartridge 800 through a contact section 802 of the connector 801. A head guide 303 fastens the scan head cartridge 800 to the carriage 305. The scanned signal and the control signal are exchanged with the printer/scanner controller 406 of the printer/scanner block via the contact section 802 and a flexible cable 304.

Figure 9:
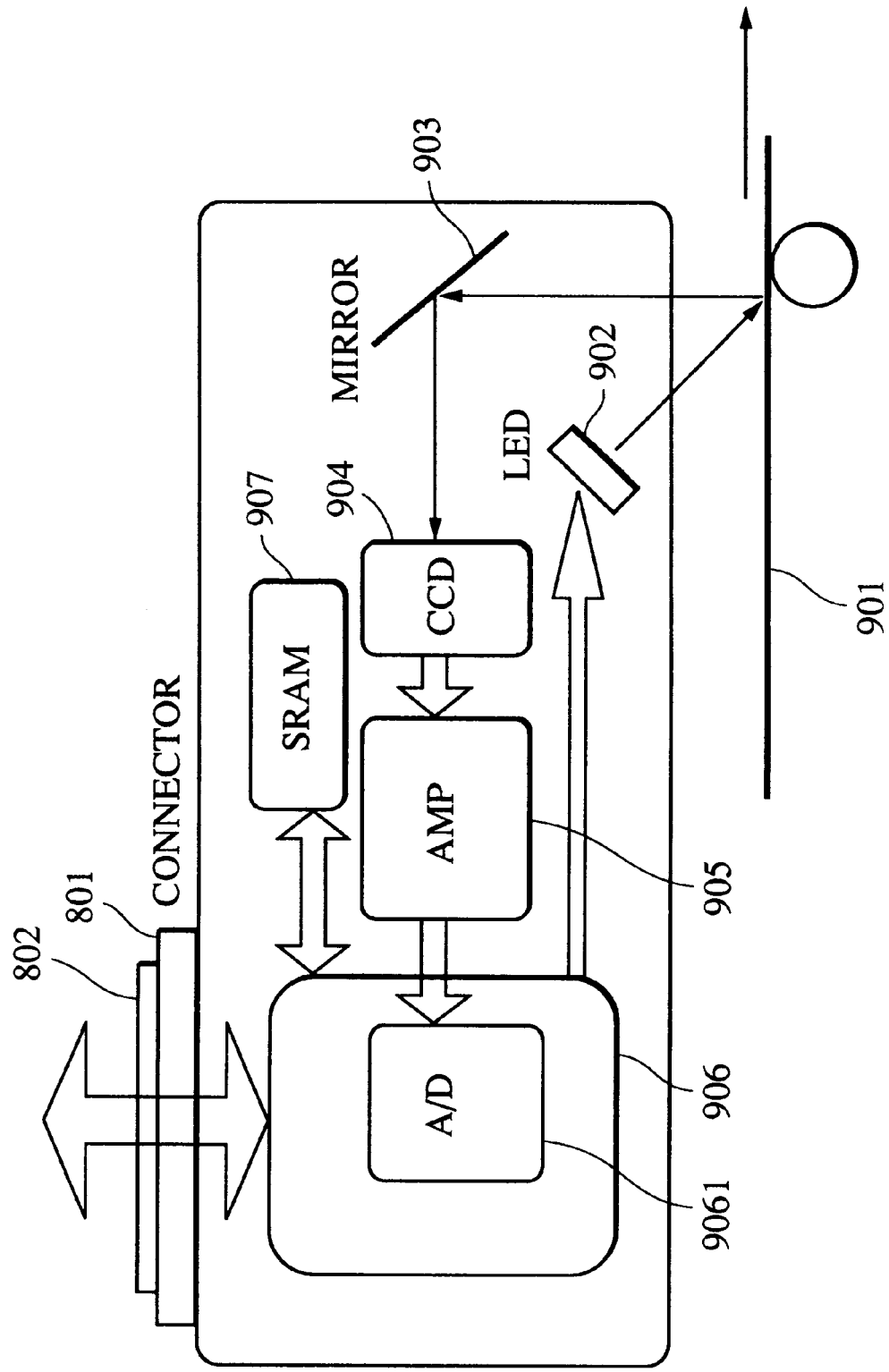
FIG. 9 is a block diagram of the internal organization of the scan head cartridge.
Figure 10:
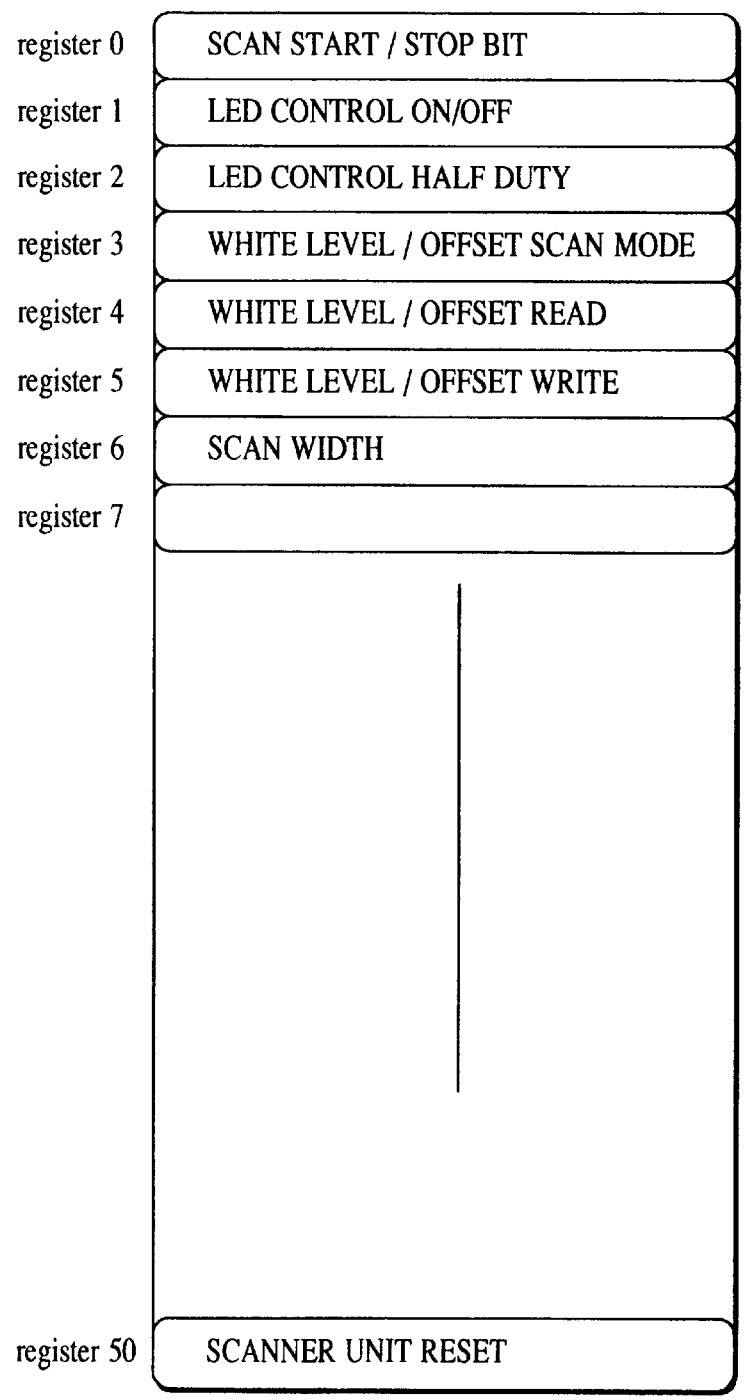
FIG. 10 shows the map of an I/O port register in the scan controller 906 in the scan head cartridge.

FIG. 9 is the block diagram showing the internal organization of the scan head cartridge 800 of FIG. 8. A flexible board on which electronic components shown are mounted is disposed inside the cartridge in a manner that the flexible board surrounds the components of an internal optical system in a box-like configuration. Connector 801 exchanges the control signal and the scanned signal with the printer/scanner block, and reference numeral 802 designates its contact section. An LED device 902 is a light source for illuminating an original document 901, and lights when power is supplied via the connector 801. When the light source 902 illuminates the original 901, a mirror 903 re-directs the light ray reflected from the original 901 toward a CCD sensor 904. The analog output that the CCD sensor 904 gives in response to the incident light ray is amplified by an amplifier 905, and then is fed to a scanner controller IC 906. IC 906 exchanges data and commands with the printer/scanner block, outputs control signals to the LED 902 and CCD 904 in accordance with the commands from the printer/scanner block, and transmits the amplified analog signal from the CCD 904 to an A/D converter block 9061 and to the printer/scanner block as well. A working SRAM 907 stores two types of A/D reference values, namely the white level reference value and offset value, as well as the status of the scanner, while expanding the scanned data. The I/O port registers in the scanner controller 906 exchange commands with the printer/scanner. FIG. 10 shows the register map of the I/O port.

Reading Scanned Data

Referring to FIG. 9, the process of data reading of the scanner is discussed.

To read data, the white level reference needs to be read and stored first. The white level standard sheet is set up in a scanning position in the same way as an ordinary original document. When the host, shown in FIG. 2, issues a white level reference read command to the printer/scanner block 219, the printer/scanner block 219 in turn issues a white level reference read command to the scanner controller 906, while driving the motor driver 405 in FIG. 4. Driven by the carriage motor 310, the scan head cartridge 800 scans the white level standard sheet in the direction of line while the paper transport motor 308 advances the white level standard sheet 901 in the direction of column. The white level reference is thus read. Also, the offset data of a dark level reference is obtained with the scanner light source LED extinguished.

Under the control of the scanner controller 906, both the resulting white level reference data and the offset data of dark level reference are once directly transferred to the host 200, and then transferred from the host 200 to SRAM 907 to be stored there. The resulting white level reference data stored in SRAM 907 is continuously used until power is removed or until any modification is introduced in the operating environment of the host 200. Thus, the time required for measuring a white level reference at each scanning is saved.

A real original document is read in the same way as the white level standard sheet has been read, and the read data is stored in SRAM 907. The stored data is subjected to a comparison process referencing to the white level reference data and offset data in the scanner controller 906, and then transferred to the host 200 via the printer/scanner block 219, as actually read data. The comparison process comprises converting the read data into an expression in percentage over a full range with the offset data set to 0% and the white level reference data set to 100%.

Figure 11:
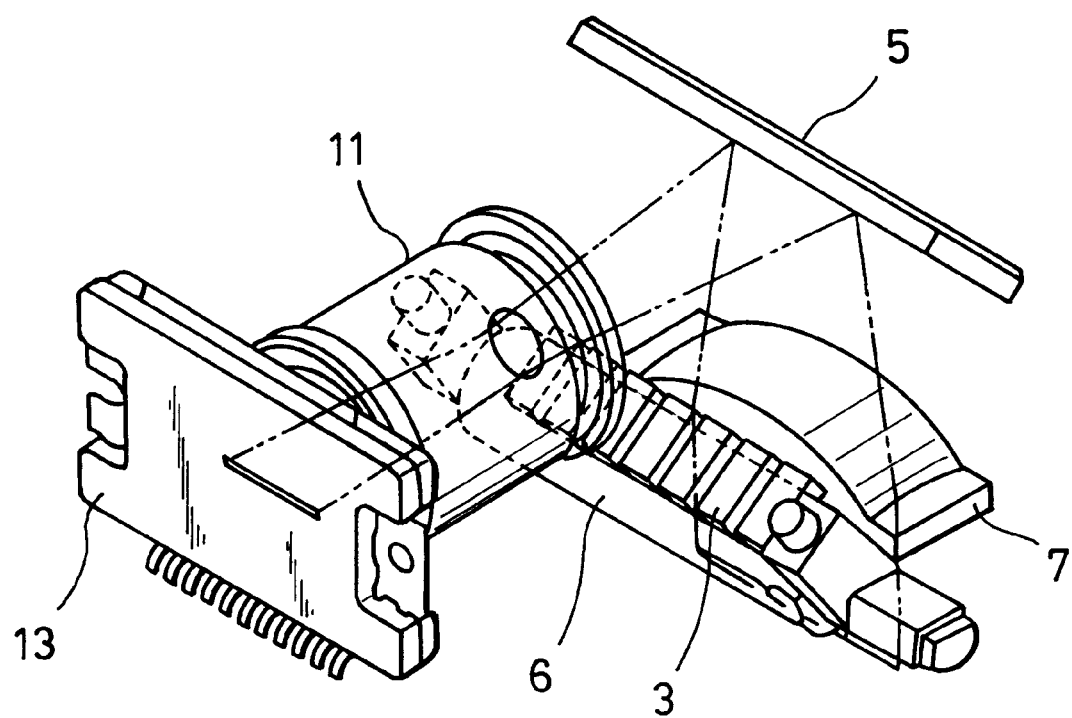
FIG. 11 is a perspective view showing the optical path of the reading light ray reflected and the components of the optical system of the scan head cartridge.
Figure 12:
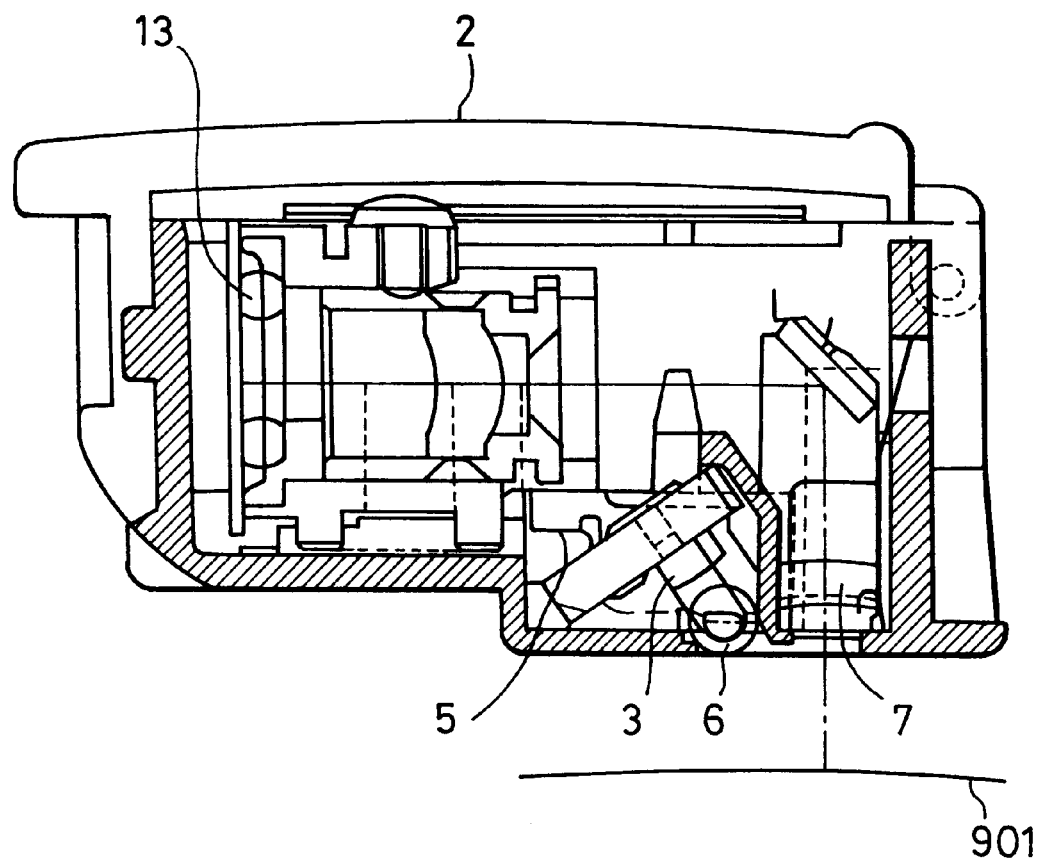
FIG. 12 is a side view showing the optical path of the reflected reading light ray and the components of the optical system of the scan head cartridge.

FIGS. 11 and 12 show the arrangement of the components of the optical system in the scan head cartridge 800 and the optical path of the reflected light ray. Referring to both figures, the scan head cartridge 800 will now be described.

A case 2 houses a rod lens 6 having a cylindrical configuration, as collector means. The rod lens 6 is arranged in the vicinity of LEDs 3 such that it extends along the row of the LEDs 3. The axis of illumination of the LEDs 3 passes the center of the working surface of the rod lens 6, and enters obliquely to the plane of the original 901. The light ray reflected from the original 901 passes through a field lens 7, as a first imaging lens, whose optical central axis is approximately at a right angle to the plane of the original 901, and the light ray is then reflected at 90° off a mirror 5 arranged in parallel with the scan width to propagate substantially in parallel with the plane of the original 901. An aperture 11 forms an imaging plane on which the field lens 7 focuses the light ray. Disposed behind the aperture 11 is a second imaging lens. The imaging position of the second imaging lens agrees with the position of a CCD sensor 13.

Figure 13:
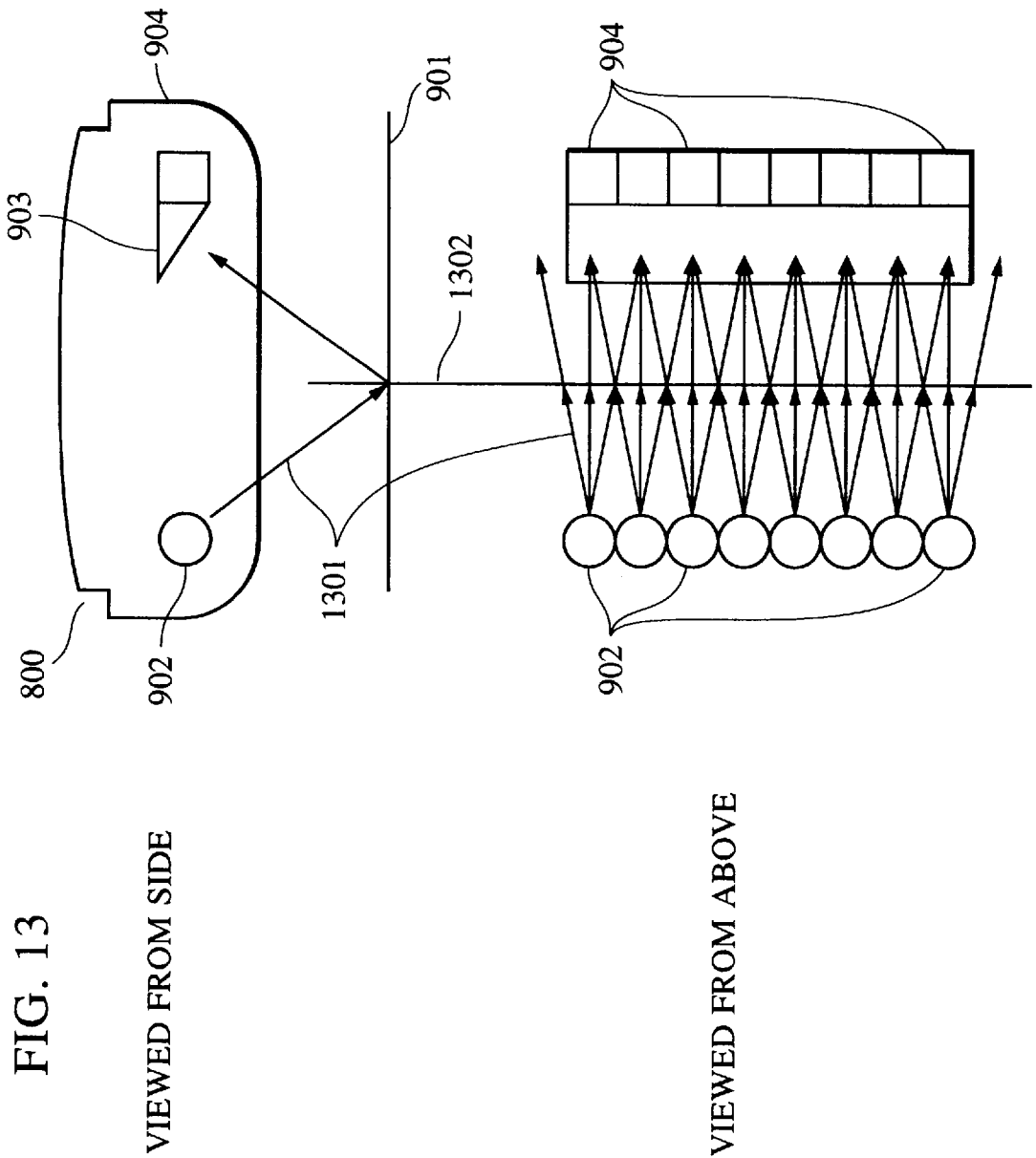
FIG. 13 shows the optical path of the reflected reading light ray of the scan head cartridge.

FIG. 13 shows the optical path of the reflected reading light ray shown in FIGS. 11 and 12. FIG. 13 shows a top view and a side view of the optical path of the reflected reading light ray.

The light ray is designated by 1301. A scan line 1302 represents a line of reflection 1302 at which the light ray 1301 emitted from LEDS 902 is reflected off the original 901 to be read, toward a CCD sensor 904.

As can be understood from FIG. 13, the light rays emitted by a row of plurality of LEDs 902 are reflected off the line of reflection 1302, and collected by a receiving lens and the mirror 903, and then reach a plurality of CCD sensors 904 arranged in a row.

Figure 14A:
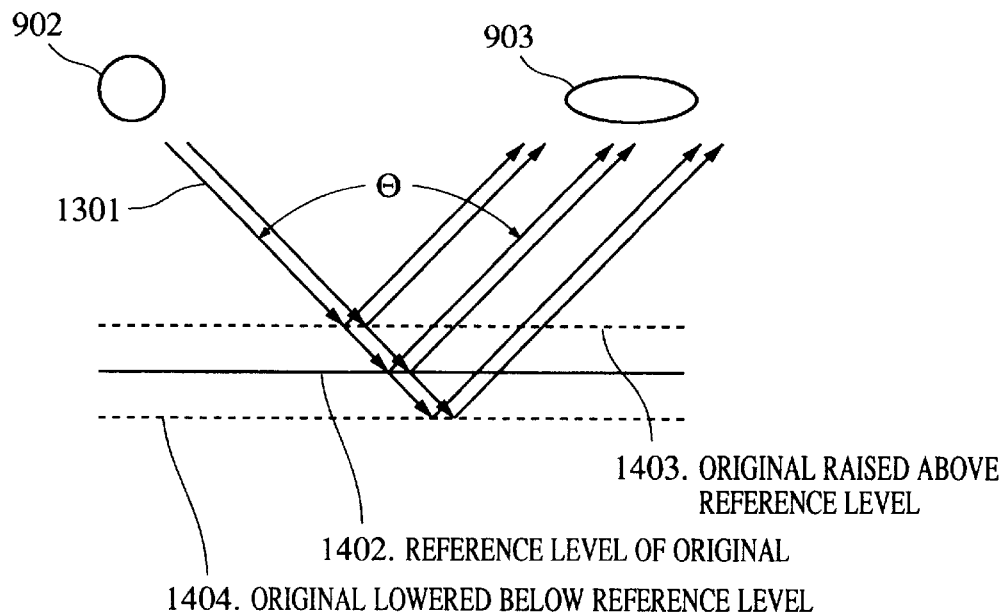
FIGS. 14(a) and 14(b) show the optical section of the scan head cartridge.
Figure 14B:
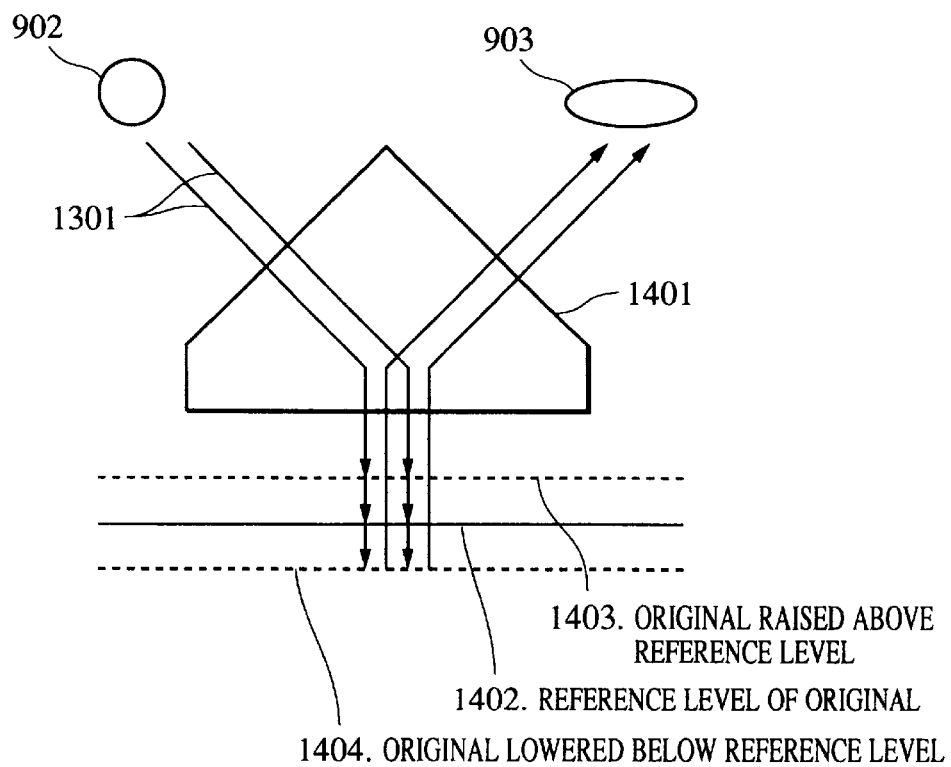

Although the scan head cartridge 800 thus constructed is convenient in implementing a miniature and low-cost design, the incident light ray and reflected light ray make an angle θ as shown in FIG. 14(*a*) because the LEDs as the light source obliquely illuminate the plane of the original. For this reason, when the original is shifted from its reference height level 1402 to a raised position 1403 or a lowered position 1404, the light ray reflected off a different position on the original enters the receiving lens and the mirror 903, making it impossible for the scan head cartridge 800 to pick up the image accurately.

To resolve this problem, a penta prism 1401 shown in FIG. 14(*b*) is useful. Referring to FIG. 14(*b*), the light rays from the LEDs 902 illuminate the plane of the original at a right angle, and the light rays are reflected off the plane of the original at a right angle as well. Even if the original is shifted from the reference height level 1402, the reflected light rays enter the receiving lens and mirror 903 in the same position, and thus the scan head cartridge 800 accurately reads the image.

As described above, the scan head cartridge in this embodiment is miniaturized with a small number of LEDs 902, a short receiving lens and mirror 903, a total of 128 CCD sensors 904 with sensor spacing of 1/360 inch and a scan width of 0.36 inch.

Figures 15, 16:
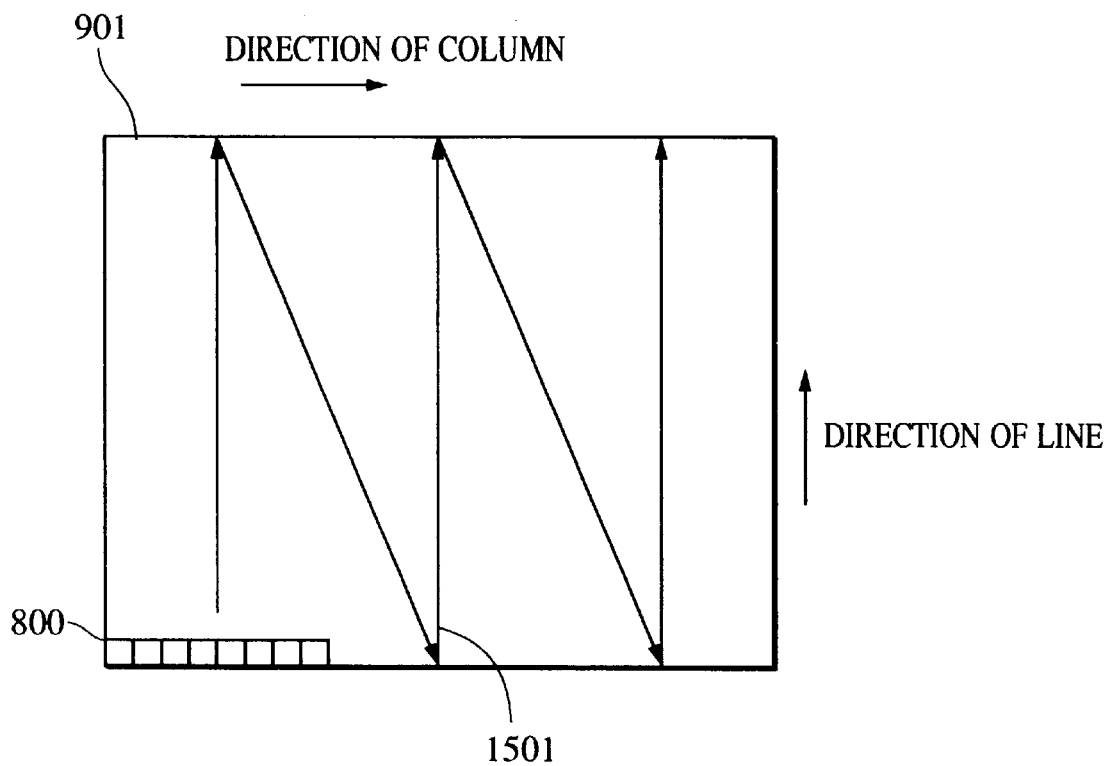
FIG. 15 illustrates the movement of the scan head cartridge when it is used to read the image.
FIG. 16 shows the accumulation time, carriage speed, and reading resolution in the scanner.

FIG. 15 shows an operation example in which the above scan head cartridge 800 scans the entire surface of the original document 901 to be read. The scanning operation is performed by moving the scan head of 128 CCD sensors 904 arranged in the direction of column, in the direction of row (line). In this case, the scan width or swath in the direction of column is only 0.6 inch. To scan the entire surface of the original 901 to be read, another cycle of scan should be repeated each time the original 901 is fed by the scan width in succession to each previous scan cycle. In this embodiment, the scan head cartridge 800 is designed to scan a plurality of times as shown by the orbit 1501 of the scan head.

FIG. 16 lists the reading resolution of the scan head cartridge with respect to the carriage speed and accumulation time. By the accumulation time is meant the time required to read one pixel. The carriage speed means the speed of the scan head cartridge 800 in the direction of a line. In this case, the reading resolution of the scan head cartridge 800 is expressed by the following equation.

$$\text{Reading resolution} = 1/(\text{accumulation time} \times \text{carriage speed}) \quad 1$$

The device of this embodiment is now discussed for the cases in which reading resolution is 360 dpi with an accumulation time of 256 μs and the reading resolution is 180 dpi with an accumulation time of 512 μs.

Figure 17:
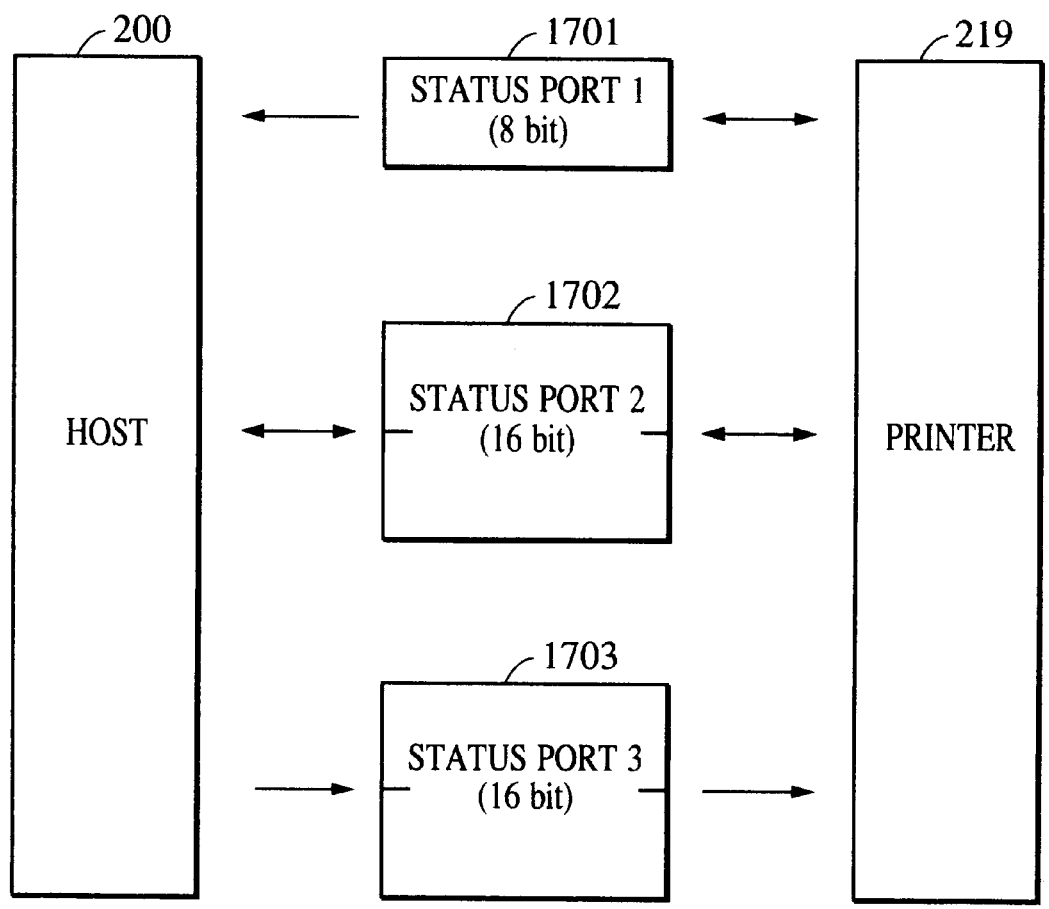
FIG. 17 is a block diagram showing dedicated status ports used for exchanging data between a host personal computer 200 and a printer/scanner block 219 in the serial printer/scanner built-in personal computer system.

FIG. 17 shows dedicated status ports used for exchanging data between the host 200 and the printer/scanner block 219.

A status port 1, designated 1701, is constructed of 8 bits, and is used to exchange data concerning statuses of other status ports and the printer/scanner block 219. A status port 2, designated 1702, is constructed of 16 bits, and is used to exchange commands and data. A status port 3, designated 1703, is constructed of 16 bits, and is used to transmit print image data from the host 200 to the printer/scanner block 219.

FIG. 18 describes in detail the status port 1, designated 1701. Each bit can be referenced from both the host 200 and the printer/scanner block 219.

Bit 0 at 1801 is 1 when the host 200 is sending data to the printer/scanner 219 via the status port 2 at 1702, and is 0 when the host 200 is not sending. Bit 1 at 1802 is 1 when the printer/scanner block 219 is sending data to the host 200 via the status port 2 at 1702, and is 0 when the printer/scanner block 219 is not sending. Bit 2 at 1803 is 0 when data transfer is enabled from the host 200 to the printer/scanner block 219 via the status port 3 at 1703, and is 1 when data transfer is disabled. Bit 3 at 1804 is 0 when the printer/scanner block 219 is powered, and is 1 when the printer/scanner block 219 is not powered. Bit 4 at 1805 is 1 when the printer/scanner block 219 is busy, and is 0 when the printer/scanner block 219 is ready. Bit 5 at 1806 is 1 when initialization of the status ports 1701–1703 is in progress, and is 0 when the status ports 1701–1703 are already initialized.

FIG. 19 is a table of commands the host 200 sends to the printer/scanner block 219 via the status port 2 at 1702. The host 200 writes these commands on the status port 2 at 1702, and sets the flag at the bit 0 at 1801. Upon detecting the flag set at the bit 0 at 1801, the printer/scanner block 219 performs a process in accordance with the command written onto the status port 2 at 1702 and then resets the flag at the bit 0 at 1801. When the printer/scanner block 219 completes the process, it writes the result of the process to the status port 2 at 1702, setting the flag at the bit 1 at 1802. Upon detecting the flag at the bit 1 at 1802, the host 200 reads the content of the status port 2 at 1702, and resets the flag at the bit 1 at 1802 when the reading is completed.

The commands will now be discussed in detail. 1000H at 1901 initializes the status ports 1, 2, and 3.

4000H at 1902 transfers a print image. After writing this command, printing is accomplished by writing the image data itself onto the status port 3 at 1703.

8000H–8F78H at 1903 is a command for reading the scanner. Its lower 12 bits represent a feed amount after a scanning operation of an image. When the command is written, the image data read is sequentially sent from the printer/scanner block 219 to the host 200 via the status port 2 at 1702. After the image data is transferred, the feed amount indicated by the lower 12 bits is fed, and the reading operation is completed. A unit of the feed amount equals 1/360 inch.

9000H–9F78H at 1904 is a command for specifying the feed operation. Its lower 12 bits specify the feed amount. Unit of the feed amount is 1/360 inch.

9FF0H at 1905 is a command for discharging the paper.
9FF1H at 1906 is a command for feeding the paper.

A801H at 1907 is a command for collecting the information about the head currently mounted on the printer/scanner block 219. When this command is issued, the head information of 1 byte shown in FIG. 20 is sent from the printer/scanner block 219 to the host 200 via the status port 2 at 1702. Bit 0 at 2001 in FIG. 20 indicates the type of head currently mounted on the printer/scanner block 219. When it is 0, the scan head is now mounted. When it is 1, the print head is now mounted. Bit 1 at 2002 indicates whether any head is mounted on the printer/scanner block 219. When it is 0, no head is mounted, and when it is 1, a head is mounted.

A805H at 1908 in FIG. 19 is a command for collecting the information about the reading resolution setting set in the printer/scanner block 219. When this command is issued, the printer/scanner block 219 sends to the host 200 the information of 1 byte indicating the reading resolution as shown in FIG. 21. As shown, when bit 0 at 2101 in FIG. 21 is 1, the reading resolution is 360 dpi. When bit 1 at 2102 is 1, the reading resolution is 180 dip, and when bit 2 at 2103 is 1, the reading resolution is 90 dpi. No more than one bit can be 1 at any one time.

AD00H–AD3FH at 1909 is a command for collecting the white level reference value detected at the accumulation time setting of 512 µs. The lower 8 bits correspond to dots 0–127. Upon receiving this command, the printer/scanner block 219 issues 1 byte of the white level reference value at a respective dot to the host 200 via the status port 2 at 1702.

AD40H–AD7FH at 1910 is a command for collecting the white level reference value detected at the accumulation time setting of 256 ps. Lower 8 bits correspond to dots 0–127. Upon receiving this command, the printer/scanner block 219 issues 1 byte of the white level reference value at a respective dot to the host 200 via the status port 2 at 1702.

AD80H at 1911 is a command for collecting the ID of the head. Upon receiving the command, the printer/scanner block 219 sends the ID of the head to the host 200 via the status port 2 at 1702.

AD81H at 1912 is a command for collecting the information of the internal temperature inside the printer/scanner block 219. Upon receiving this command, the printer/scanner block 219 sends 1 byte internal temperature information to the host 200 via the status port 2 at 1702.

ADF0H at 1913 is a command for executing the measurement of the white level reference. Upon receiving this command, the printer/scanner block 219 performs the measurement of the white level reference at each of the accumulation time settings of 512 µs and 256 µs.

B805H at 1914 is a command for setting a new reading resolution. A new reading resolution is set by sending reading resolution information of 1 byte as shown in FIG. 20 to the printer/scanner block 219 in succession to this command.

BD00H at 1915 is a command for sending the white level reference value at the accumulation time setting of 512 µs from the host 200 to RAM 403 in the printer/scanner block 219. Its lower 8 bits correspond sequentially to head dots 0–127. The white level reference value of each respective dot is set by sending the white level reference value of 1 byte to the printer/scanner block 219 in succession to this command. The white level reference value in RAM 403 is written onto SRAM 907 in the scan head prior to the real scanning operation.

BD40H–BD7FH at 1916 is a command for sending the white level reference value at the accumulation time setting of 256 µs from the host 200 to RAM 403 in the printer/scanner block 219. Its lower 8 bits correspond sequentially to head dots 0–127. The white level reference value of each respective dot is set by sending the white level reference value of 1 byte to the printer/scanner block 219 in succession to this command. The white level reference value in RAM 403 is written onto SRAM 907 in the scan head prior to the real scanning operation. Although the white level reference value is set herein based on the accumulation time, alternatively the white level reference value may be set based on the reading resolution.

BDF0H at 1917 is a command for writing the white level reference value in RAM 403 in the printer/scanner block 219, onto the scan head.

D000H at 1918 is a command for moving the carriage to its head replacement position. Upon receiving the command, the printer/scanner block 219 initializes the head and then moves the carriage to its home position.

D100H at 1919 is a command for returning the carriage from its read replacement position to its home position. Upon receiving this command, the printer/scanner block 219 initializes the head and moves the carriage to its home position.

Correcting White Reference Data

Figure 22:
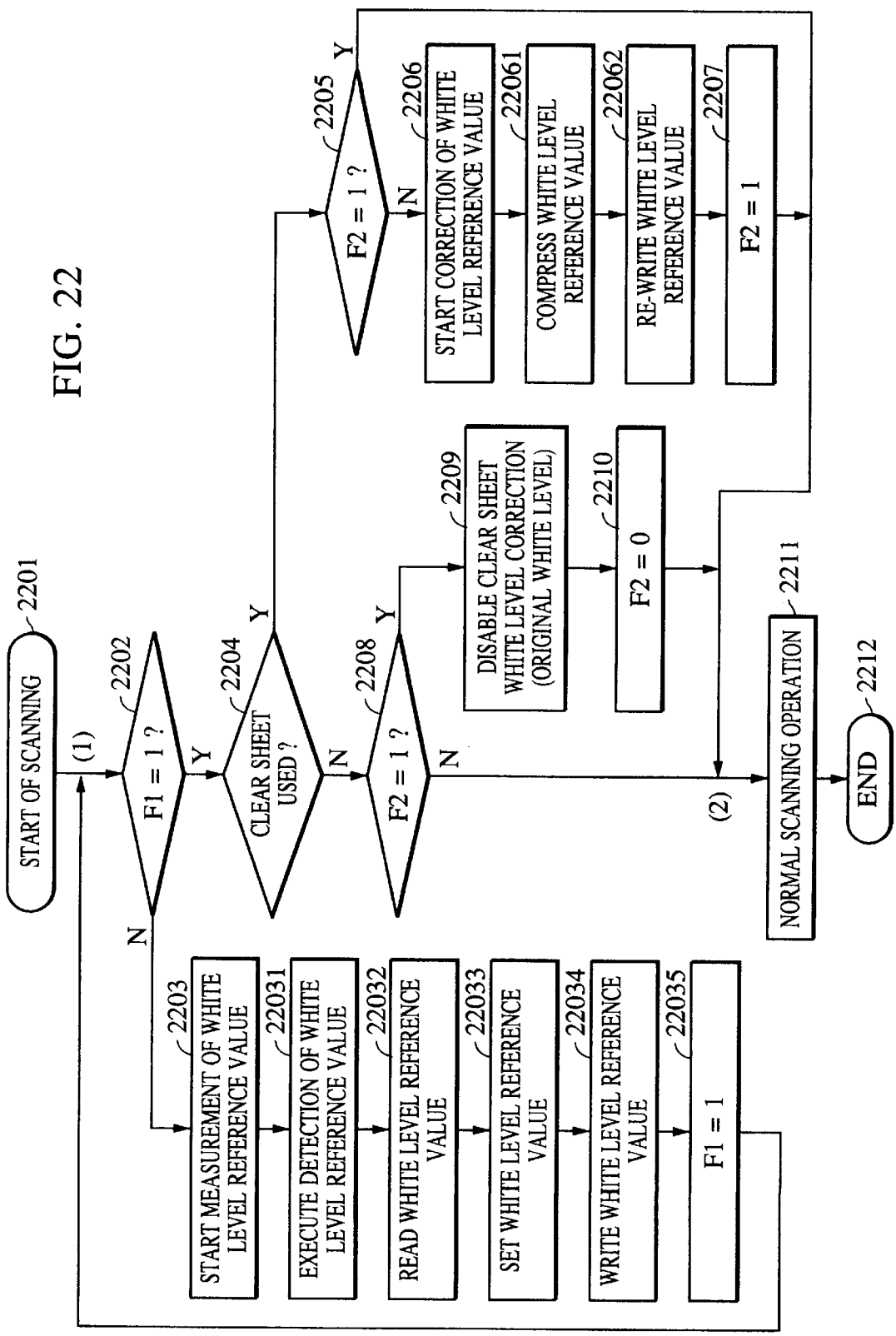
FIG. 22 is a flow diagram for the correction of white level reference data.

FIG. 22 is the flow diagram for the correction sequence of the white reference data. The correction procedure will now be discussed with reference to FIG. 22.

A reading operation starts at step 2201 in FIG. 22. At step 2202, the white reference measurement flag F1 is referenced. When the white reference measurement flag F1=1, and thus a Y (yes) condition is present, the sequence goes to step 2204. When the flag F=0, a N (No) condition, the sequence goes to step 2203 to measure the white level reference value. At step 2203, the white reference measurement starts. At step 22031, the host 200 issues the command 1913 "execute measurement of white level reference value" in FIG. 19 for detection of the white level reference. At step 22032, in response to the command 1909/1910 "read white level reference," the white level reference value measured by the scan head cartridge 800 is sent to the host 200. At step 22033, the host 200 issues the command 1915/1916 "set white level reference value" for setting the white level reference value to store the white level reference value in RAM 403 in the printer/scanner block 219. At step 22034, the printer/scanner block 219 writes the white level reference value onto SRAM 907 in the scan head cartridge 800 in response to the command 1917 "execute setting of white level reference" for writing the white level reference value. After these steps, the white reference measurement flag F1 is set to "1." The sequence returns to step 2202 via (1).

At step 2204, a determination is made of whether the clear sheet is used. When it is not used, the sequence goes to step 2208. When it is used, the sequence goes to step 2205, where a clear sheet correction flag F2is checked. At step 2205, the sequence goes to step 2211 via (2) when F2=1. When F2=0, the sequence goes to step 2206. The white level reference value correction starts at step 2206. At step 22061, the host 200 compresses the white level reference value at a predetermined ratio, and regards it as a clear sheet white level reference value. At step 22062, the corrected clear sheet white level is written onto SRAM 907 in the scan head cartridge 800 according to the commands 1915/1916 "set white level reference value" and the command 1917 "execute setting of the white level reference." Finally, the clear sheet correction flag F2 is set to "1," at step 2207, and then the sequence goes to (2).

If the clear sheet is not being used, the sequence goes to step 2208, where the clear sheet correction flag F2 is checked to determine whether the clear sheet was used previously. When it was not used, that is, when F2=0, the sequence goes to (2). When it was used, that is, when F2=1, the sequence goes to step 2209. At step 2209, to put the clear sheet white level back to the original white level, the host 200 issues the commands 1915/1916 "set white level reference value" and the command 1917 "execute setting of the white level reference" to replace the white level reference value with the original white level reference value in SRAM 907 in the scan head cartridge 800. Finally, at step 2210, the clear sheet correction flag F2 is set to "0." A normal scanning operation is performed at step 2211 and completed at step 2212.

According to the embodiment of the present invention, the scan head cartridge is designed to replace the print head cartridge on the carriage of the printer/scanner block that prints an image on a recording medium. Thus, the printer/scanner block in the device works as an image scanner. Based on the principle that processing the read image is performed relative to the white level reference data, the device predicts data degradation due to the variation of reflectance of the original attributed to transmissivity of the clear sheet and modifies the white level reference value in software before starting the actual image reading. A single cycle of this correction process is performed prior to the use of the clear sheet, and thereafter, modified white level reference data is used to correct the read data.

In the printer/scanner block that allows the scan head cartridge to replace the print head cartridge, once the clear sheet is subjected to the white level reference measurement, it is not necessary to measure the white level any more thereafter. Furthermore, data correction is performed without slowing down the reading speed (prolonging the accumulation time).

In the printer/scanner block featuring a compact and low-cost design, the host is capable of modifying the white level reference data in the scan head cartridge when a clear sheet is used. This arrangement eliminates the need for the white level reference value measurement that would be otherwise needed at each scanning operation, and further incurs no slowdown in the scanning speed. The white level reference value may be corrected not only to meet the clear sheet condition but also to comply with a diversity of original document conditions.

What is claimed is:

1. An image processing apparatus having a slidable carriage comprising a read cartridge that is detachably mounted on the carriage, said cartridge comprising:

photoelectric converting means for optically reading an image from an original document, converting the image into an image signal and outputting the image signal; and memory means for storing reference data that is used to correct the image signal output from said photoelectric converting means, the reference data being rewritable by said image processing apparatus.

2. An image processing apparatus according to claim 1, wherein said cartridge further comprises a light source for illuminating the original document.

3. An image processing apparatus according to claim 2, wherein said cartridge further comprises optical means for guiding a light ray reflected off the original document illuminated by said light source, to said photoelectric converting means.

4. An image processing apparatus according to claim 3, wherein said cartridge further comprises amplifier means for amplifying the image signal output from said photoelectric converting means.

5. An image processing apparatus according to claim 4, wherein said cartridge further comprises A/D converter means for A/D converting the image signal output from said photoelectric converting means into a digital signal.

6. An image processing apparatus according to claim 5, wherein said cartridge further comprises controller means for controlling a reference for said A/D converter means based on the reference data stored in said memory means.

7. An image processing apparatus according to claim 1, wherein the reference data is white level reference data.

8. An image processing apparatus according to claim 1, wherein the reference data is offset data.

9. An image processing system comprising:

a control apparatus; and an image processing apparatus connected to and controlled by the control apparatus, said image processing apparatus having a slidable carriage, comprising a read cartridge that is detachably mounted on the carriage, said cartridge comprising:

photoelectric converting means for optically reading an image from an original document, converting the image into an image signal and outputting the image signal, and memory means for storing reference data that is used to correct the image signal output by said photoelectric converting means, the reference data being rewritable by said control apparatus.

10. An image processing system according to claim 9, wherein said cartridge further comprises a light source for illuminating the original document.

11. An image processing system according to claim 10, wherein said cartridge further comprises optical means for guiding a light ray reflected off the original document illuminated by said light source, to said photoelectric converting means.

12. An image processing system according to claim 11, wherein said cartridge further comprises amplifier means for amplifying the image signal output from said photoelectric converting means.

13. An image processing system according to claim 12, wherein said cartridge further comprises A/D converter means for A/D converting the image signal output from said photoelectric converting means into a digital signal.

14. An image processing system according to claim 13, wherein said cartridge further comprises controller means for controlling a reference for said A/D converter means based on the reference data stored in said memory means.

15. An image processing system according to claim 9, wherein said control apparatus modifies the reference data stored in said memory means.

16. An image processing system according to claim 15, wherein said control apparatus modifies the reference data based on a reading condition of said photoelectric converting means.

17. An image processing system according to claim 16, further comprising a holding member for holding the original document, wherein said control apparatus modifies the reference data when said photoelectric converting means reads the original document held by said holding member.

18. An image processing system according to claim 16, wherein said control apparatus modifies the reference data based on an accumulation time of said photoelectric converting means.

19. An image processing system according to claim 16, wherein said control apparatus modifies the reference data based on a resolution of said photoelectric converting means.

20. An image processing system according to claim 9, wherein said image processing apparatus further comprises a print head cartridge.

21. An image processing system according to claim 20, wherein one of said read cartridge and said print head cartridge is selectively mounted on said carriage.

22. An image processing system according to claim 9, wherein the reference data is white level reference data.

23. An image processing system according to claim 9, wherein the reference data is offset data.

24. A read cartridge that is detachably mounted on a slidable carriage of an image processing apparatus, said cartridge comprising:
   photoelectric converting means for optically reading an image from an original document, converting the image into an image signal and outputting the image signal; and
   memory means for storing reference data that is used to correct the image signal output from the photoelectric converting means, the reference data being rewritable by the image processing apparatus.

25. A cartridge according to claim 24, wherein said cartridge further comprises a light source for illuminating the original document.

26. A cartridge according to claim 25, wherein said cartridge further comprises optical means for guiding a light ray reflected of the original document illuminated by said light source, to said photoelectric converting means.

27. A cartridge according to claim 26, wherein said cartridge further comprises amplifier means for amplifying the image signal output from said photoelectric converting means.

28. A cartridge according to claim 27, wherein said cartridge further comprises A/D converter means for A/D converting the image signal output from said photoelectric converting means into a digital signal.

29. A cartridge according to claim 28, wherein said cartridge further comprises controller means for controlling a reference for said A/D converter means based on the reference data stored in said memory means.

30. A cartridge according to claim 24, wherein the reference data is white level reference data.

31. A cartridge according to claim 24, wherein the reference data is offset data.

32. An image processing apparatus having a slidable read cartridge, said cartridge comprising:
   photoelectric converting means for optically reading an image from an original document, converting the image into an image signal and outputting the image signal; and
   memory means for storing reference data that is used to correct the image signal output from said photoelectric converting means, the reference data being rewritable by said image processing apparatus.

33. An image processing apparatus according to claim 32, wherein said cartridge further comprises a light source for illuminating the original document.

34. An image processing apparatus according to claim 33, wherein said cartridge further comprises optical means for guiding a light ray reflected off the original document illuminated by said light source, to said photoelectric converting means.

35. An image processing apparatus according to claim 34, wherein said cartridge further comprises amplifier means for amplifying the image signal output from said photoelectric converting means.

36. An image processing apparatus according to claim 35, wherein said cartridge further comprises A/D converter means for A/D converting the image signal output from said photoelectric converting means into a digital signal.

37. An image processing apparatus according to claim 36, wherein said cartridge further comprises controller means for controlling a reference for said A/D converter means based on the reference data stored in said memory means.

38. An image processing apparatus according to claim 32, wherein the reference data is white level reference data.

39. An image processing apparatus according to claim 32, wherein the reference data is offset data.

40. An image processing system comprising:
   a control apparatus; and
   an image processing apparatus connected to and controlled by the control apparatus, said image processing apparatus having a slidable read cartridge, said cartridge comprising:
   photoelectric converting means for optically reading an image from an original document, converting the image into an image signal and outputting the image signal, and
   memory means for storing reference data that is used to correct the image signal output by said photoelectric converting means, the reference data being rewritable by said control apparatus.

41. An image processing system according to claim 40, wherein said cartridge further comprises a light source for illuminating the original document.

42. An image processing system according to claim 41, wherein said cartridge further comprises optical means for guiding a light ray reflected off the original document illuminated by said light source, to said photoelectric converting means.

43. An image processing system according to claim 42, wherein said cartridge further comprises amplifier means for amplifying the image signal output from said photoelectric converting means.

44. An image processing system according to claim 43, wherein said cartridge further comprises A/D converter means for A/D converting the image signal output from said photoelectric converting means into a digital signal.

45. An image processing system according to claim 44, wherein said cartridge further comprises controller means for controlling a reference for said A/D converter means based on the reference data stored in said memory means.

46. An image processing system according to claim 40, wherein said control apparatus modifies the reference data stored in said memory means.

47. An image processing system according to claim 46, wherein said control apparatus modifies the reference data based on a reading condition of said photoelectric converting means.

48. An image processing system according to claim 47, further comprising a holding member for holding the original document, wherein said control apparatus modifies the reference data when said photoelectric converting means reads the original document held by said holding member.

49. An image processing system according to claim 47, wherein said control apparatus modifies the reference data based on an accumulation time of said photoelectric converting means.

50. An image processing system according to claim 47, wherein said control apparatus modifies the reference data based on a resolution of said photoelectric converting means.

51. An image processing system according to claim 40, wherein said image processing apparatus further comprises a print head cartridge.

52. An image processing system according to claim 51, wherein one of said read cartridge and said print head cartridge is selectively mounted on said carriage.

53. An image processing system according to claim 40, wherein the reference data is white level reference data.

54. An image processing system according to claim 40, wherein the reference data is offset data.

55. A slidable read cartridge that is detachably connected to an image processing apparatus, said cartridge comprising:

photoelectric converting means for optically reading an image from an original document, converting the image into an image signal and outputting the image signal; and memory means for storing reference data that is used to correct the image signal output from the photoelectric converting means, the reference data being rewritable by the image processing apparatus.

56. A cartridge according to claim 55, wherein said cartridge further comprises a light source for illuminating the original document.

57. A cartridge according to claim 56, wherein said cartridge further comprises optical means for guiding a light ray reflected of the original document illuminated by said light source, to said photoelectric converting means.

58. A cartridge according to claim 57, wherein said cartridge further comprises amplifier means for amplifying the image signal output from said photoelectric converting means.

59. A cartridge according to claim 58, wherein said cartridge further comprises A/D converter means for A/D converting the image signal output from said photoelectric converting means into a digital signal.

60. A cartridge according to claim 59, wherein said cartridge further comprises controller means for controlling a reference for said A/D converter means based on the reference data stored in said memory means.

61. A cartridge according to claim 55, wherein the reference data is white level reference data.

62. A cartridge according to claim 55, wherein the reference data is offset data.

* * * * *

UNITED STATES PATENT AND TRADEMARK OFFICE
CERTIFICATE OF CORRECTION

PATENT NO. : 5,987,186
DATED : November 16, 1999
INVENTOR(S) : JUN OIDA ET AL.

It is certified that error appears in the above-identified patent and that said Letters Patent is hereby corrected as shown below:

COLUMN 7:

Line 43, "LEDS" should read --LEDs--.

Signed and Sealed this

Nineteenth Day of December, 2000

Attest:

Q. TODD DICKINSON

Attesting Officer

Commissioner of Patents and Trademarks